(12) United States Patent
Aihara

(10) Patent No.: US 6,782,041 B1
(45) Date of Patent: Aug. 24, 2004

(54) RADIO RECEIVER AND METHOD FOR IDENTIFYING SPREADING CODES

(75) Inventor: Koichi Aihara, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 626 days.

(21) Appl. No.: 09/762,860

(22) PCT Filed: Jun. 8, 2000

(86) PCT No.: PCT/JP00/03705

§ 371 (c)(1),
(2), (4) Date: Feb. 14, 2001

(87) PCT Pub. No.: WO00/77943

PCT Pub. Date: Dec. 21, 2000

(30) Foreign Application Priority Data

Jun. 16, 1999 (JP) .......................................... 11-169698

(51) Int. Cl.[7] ................................................ H04B 1/69
(52) U.S. Cl. ...................... 375/150; 375/130; 375/136; 375/140; 375/142; 375/147; 370/208; 370/335
(58) Field of Search ................................. 376/130, 136, 376/140, 142, 143, 147, 150; 370/208, 335

(56) References Cited

U.S. PATENT DOCUMENTS 5,910,948 A * 6/1999 Shou et al. .................. 370/335
6,571,099 B1 * 5/2003 Kim et al. ................... 455/442
6,603,735 B1 * 8/2003 Park et al. ................... 370/208

FOREIGN PATENT DOCUMENTS

| EP | 852430 | 7/1998 |
|---|---|---|
| JP | 10145334 | 5/1998 |
| JP | 2000115129 | 4/2000 |
| JP | 2000138657 | 5/2000 |
| JP | 2000209126 | 7/2000 |
| WO | 9621294 | 7/1996 |
| WO | 0013358 | 3/2000 |

OTHER PUBLICATIONS

Kenichi Higuchi, et al., "DS–CDMA Kichikyokukan Kidouki Celluler ni okeru Long Code Mask wo mochiiru Kousoku Cell Search Hou", IEICE technical research report, vol. 96, No. 477, Jan. 23, 1997 (Tokyo), p. 57–63.

* cited by examiner

Primary Examiner—Shuwang Liu
(74) Attorney, Agent, or Firm—Stevens, Davis, Miller & Mosher, LLP

(57) ABSTRACT

A grouping setting section 206 controls spreading code generation sections 207 to input a plurality of long codes into an adder 208 one by one, and thereby the plural long codes are grouped. The adder 208 adds the input plural long codes to each other at every chip in each group, and a correlation section 204 calculates a correlation value between the added long codes and a received signal. A maximum correlation value detection section 205 selects a group indicating the maximum correlation value, and the grouping setting section 206 again divides the long codes included in the selected group into a plurality of groups. By the repetition of the procedures until the long codes in a group becomes one, the long code is identified.

9 Claims, 13 Drawing Sheets

FRONT OF LONG CODE

| LONG CODE A | 1 | 1 | −1 | 1 | ... |
|---|---|---|---|---|---|
| + | + | + | + | + | |
| LONG CODE B | 1 | −1 | 1 | 1 | ... |
| + | + | + | + | + | |
| LONG CODE C | −1 | 1 | 1 | −1 | ... |
| + | + | + | + | + | |
| LONG CODE D | 1 | −1 | 1 | −1 | ... |
| ‖ | ‖ | ‖ | ‖ | ‖ | |
| ADDITION CODE | 2 | 0 | 2 | 0 | ... |

RADIO RECEIVER AND METHOD FOR IDENTIFYING SPREADING CODES

TECHNICAL FIELD

The present invention relates to a radio receiver and a method for identifying spreading codes. The present invention particularly relates to a radio receiver and a method for identifying spreading codes in movable body radio communication employing the Code Division Multiple Access (hereinafter referred to as "CDMA") system.

BACKGROUND ART

Synchronous systems between base stations and asynchronous systems between base stations are applicable in movable body radio communication systems employing the CDMA system. However, it is necessary for the synchronous systems between base stations to use another system such as the Global Positioning System (GPS). Consequently, the asynchronous systems between base stations that are simpler and easier than the synchronous systems are frequently used in the mobile radio communication systems.

In a conventional CDMA asynchronous cellular system between base stations, each base station holds an intrinsic long period spreading code (hereinafter referred to as "long code") for identification, and a mobile station identifies the long code of a cell in which the mobile station connects a link by performing a cell search at the time of its initial connection and handover.

Hereinafter, FIG. 1 is referred while a conventional radio receiver and its identification method of the long code is described. FIG. 1 is a block diagram showing the schematic configuration of the conventional radio receiver. Incidentally, it is supposed that a radio signal is constituted of a plurality of frames and each frame is constituted of a plurality of slots.

In FIG. 1, an antenna 1 receives radio signals, and a radio signal reception section 2 performs the reception processing of the received signals. A slot/chip synchronization section 3 detects the timing when correlation values take the maximum value by shifting each slot of the received signals at every chip while multiplying each slot by a known short period spreading code (hereinafter referred to as "short code") for realizing slot synchronization and chip synchronization at the same time.

A plurality of correlation sections 4 calculate correlation values by multiplying the received signals by spreading codes input from a switch 8, which will be described later, respectively. A correlation section 5 receives identified long codes from the switch 8 and performs the despreading processing of the received signals.

A maximum correlation value detection section 6 detects the maximum correlation value among the plural correlation values calculated by the plural correlation sections 4. When the number of the long codes held by a spreading code generation section 7, which will be described later, namely the number of the long codes the correlation values of which with the received signals should be calculated, is larger than the number of the correlation sections 4, the maximum correlation value detection section 6 temporarily stores the calculated correlation values and detects the maximum correlation value after all correlation values have been calculated.

The spreading code generation section 7 stores a plurality of long codes, and outputs the stored long codes to the switch 8 under the control of a spreading code setting section 9, which will be described later. The switch 8 switches the long codes output from the spreading code generation section 7 to output them to any of the plural correlation sections 4 or the correlation section 5 under the control of the spreading code setting section 9, which will be described later.

The spreading code setting section 9 controls the spreading code generation section 7 and the switch 8 so that the correlation values of all of the long codes with the received signals can be calculated. The spreading code setting section 9 identifies a long code, which is judged by the maximum correlation value detection section 6 to be the long code generating the maximum correlation value, as the long code of the cell in which a link is connected, and sets the long code in the correlation section 5. A demodulation section 10 obtains received data by performing the RAKE combining processing of the received signals, the error correction processing of them, or the like after receiving the despreading processing by the correlation section 5.

As described above, the conventional radio receiver calculates the correlation values of all of the long codes with the received signals, and identifies a long code generating the maximum correlation value as the long code of the cell in which a link is connected. The conventional radio receiver then performs the despreading processing of the received signals by the use of the identified long code to begin communication.

However, the conventional radio receiver has a problem that, because the number of the long codes is determined to be a fixed number in accordance with the design of its system, if the number of the correlation sections is increased, the scale of the equipment becomes large in spite of the decrease of the time necessary for the identification of the long codes, and if the number of the correlation sections is decreased, the time necessary for the identification of the long codes is elongated in spite of the decrease of the scale of the equipment.

DISCLOSURE OF INVENTION

The object of the present invention is to provide a radio receiver in which the scale of the configuration for the calculation of the correlation values is suppressed to be the minimum scale, and in which the time necessary for the identification of its long codes is shortened.

The subject matter of the present invention is to identify a long code by dividing a long code group including the prospective long code to be identified into a plurality of groups, and by selecting a group having the maximum correlation value in the results of the addition of the long codes in each group as the group including the long code to be identified, and further by repeating the grouping and the narrowing down of the groups in a radio receiver.

BRIEF DESCRIPTION OF DRAWINGS

FIG. 12 is a block diagram showing a schematic configuration of a radio receiver according to the embodiment 4 of the present invention.

BEST MODE FOR CARRYING OUT THE INVENTION

The attached drawings are referred while the embodiments of the present invention will be described in the following in detail.

Embodiment 1

To identify a long code is nothing but to select a long code the mutual correlation with received signals of which is highest and which generates a peak in the correlation values when it is multiplied with the received signals. A radio receiver generates a plurality of long codes with its spreading code generation section for identifying the long code.

Figure 1:
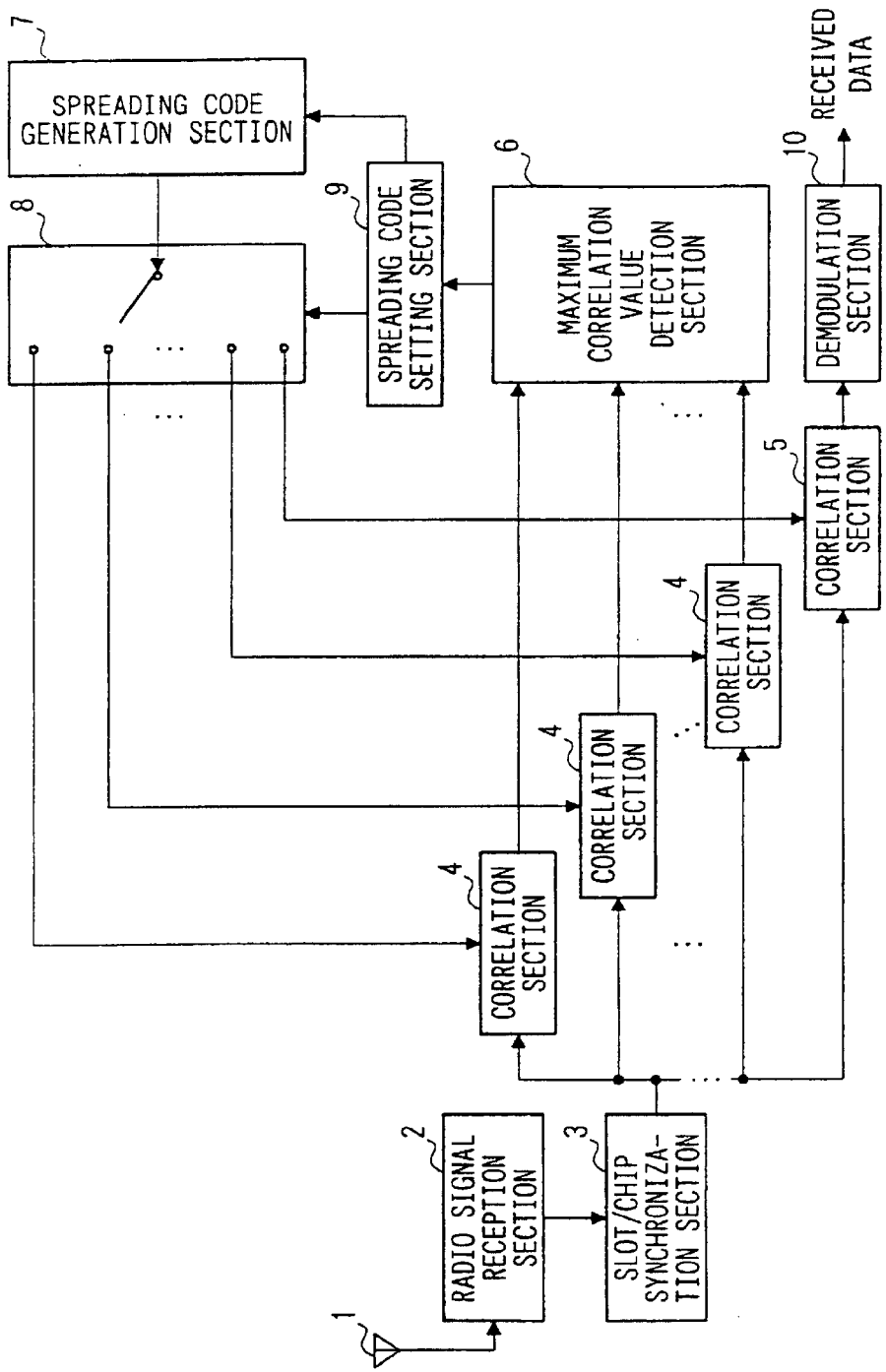
FIG. 1 is a block diagram showing the schematic configuration of a conventional radio receiver.
Figure 2:
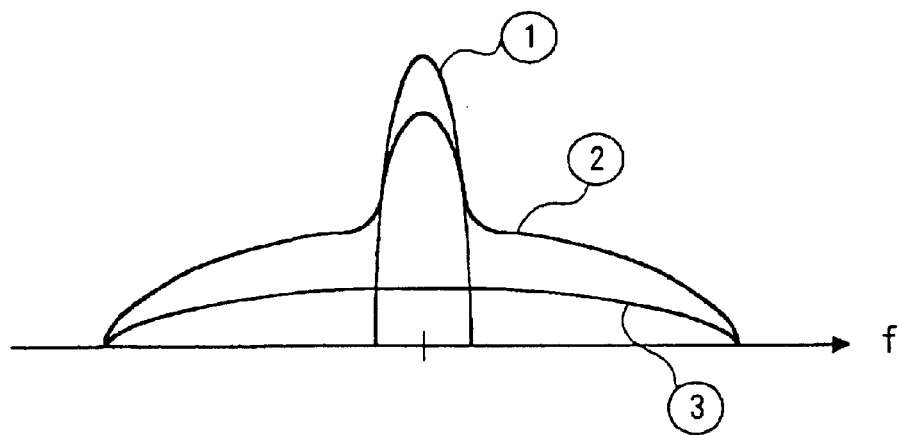
FIG. 2A is a mimetic diagram showing an aspect of the addition of four long codes at every chip.
FIG. 2B is a mimetic diagram showing spectrum distributions as the correlation results of long codes and addition codes with received signals.

Now, when two long codes or more are added to each other, a new long code (hereinafter referred to as "addition code") can be generated. FIG. 2 is referred in the following while the addition of a plurality of long codes are described. FIG. 2A is a mimetic diagram showing an aspect of the addition of four long codes at every chip, and FIG. 2B is a mimetic diagram showing spectrum distributions as the correlation results of long codes and addition codes with the received signals.

As shown in FIG. 2A, for example, in the case where four long codes A–D are added at every chip, the long codes A–D are arranged so that their fronts are trued up and chip data constituting the long codes are added at every arrangement in each long code. It is supposed in the following that such addition is expressed as "the addition of long codes at every chip".

It is to be noted that even if a long code having a high mutual correlation with a received signal is made to be an addition code by being added with another long code at every chip, the resulted addition code can still have a correlation value higher than that of an additional code generated by the mutual addition of long codes having no mutual correlation with the received signal.

That is, in FIG. 2B, the addition code generated by the addition of a long code having a high mutual correlation with a received signal and another long code does not reach the correlation result ① in the case where the correlation result is obtained as to a single long code that is to be identified and generates a peak, but the addition code can obtain a correlation result ② higher than the correlation result ③ obtained as to a long code having no mutual correlation whatever with the received signal. Incidentally, only the correlation result ③ can be obtained as to the long codes having no mutual correlation whatever, however many of them are added to each other.

Consequently, it is discovered that when correlation values are calculated about addition codes generated by grouping a plurality of long codes and adding the grouped long codes at every chip in each group, a long code to be identified is included in a group of the addition codes exhibiting the highest correlation value.

After the group including the long code to be identified has been selected in such a way, the similar narrowing down is performed to the long codes included in the selected group, and then a group including further less long codes is selected.

By the repetition of the narrowing down, the operations are concluded at the time when the number of long codes included in a group becomes one. The left long code is the long code to be identified that has the maximum correlation with the received signal.

The radio receiver according to the present embodiment utilizes such characteristics of the mutual correlation to identify a long code by dividing long codes into a plurality of groups, and by adding the long codes in each group, and further by abstracting an addition code having the maximum correlation value from generated addition codes of each group, and further by repeating the process to the abstracted group. Consequently, the number of the calculations of the correlation values with received signals can be decreased, and the scale of the configuration for the calculations of the correlation values can be suppressed to be the minimum size. In addition, the time necessary for identifying a long code can be shortened.

Figure 3:
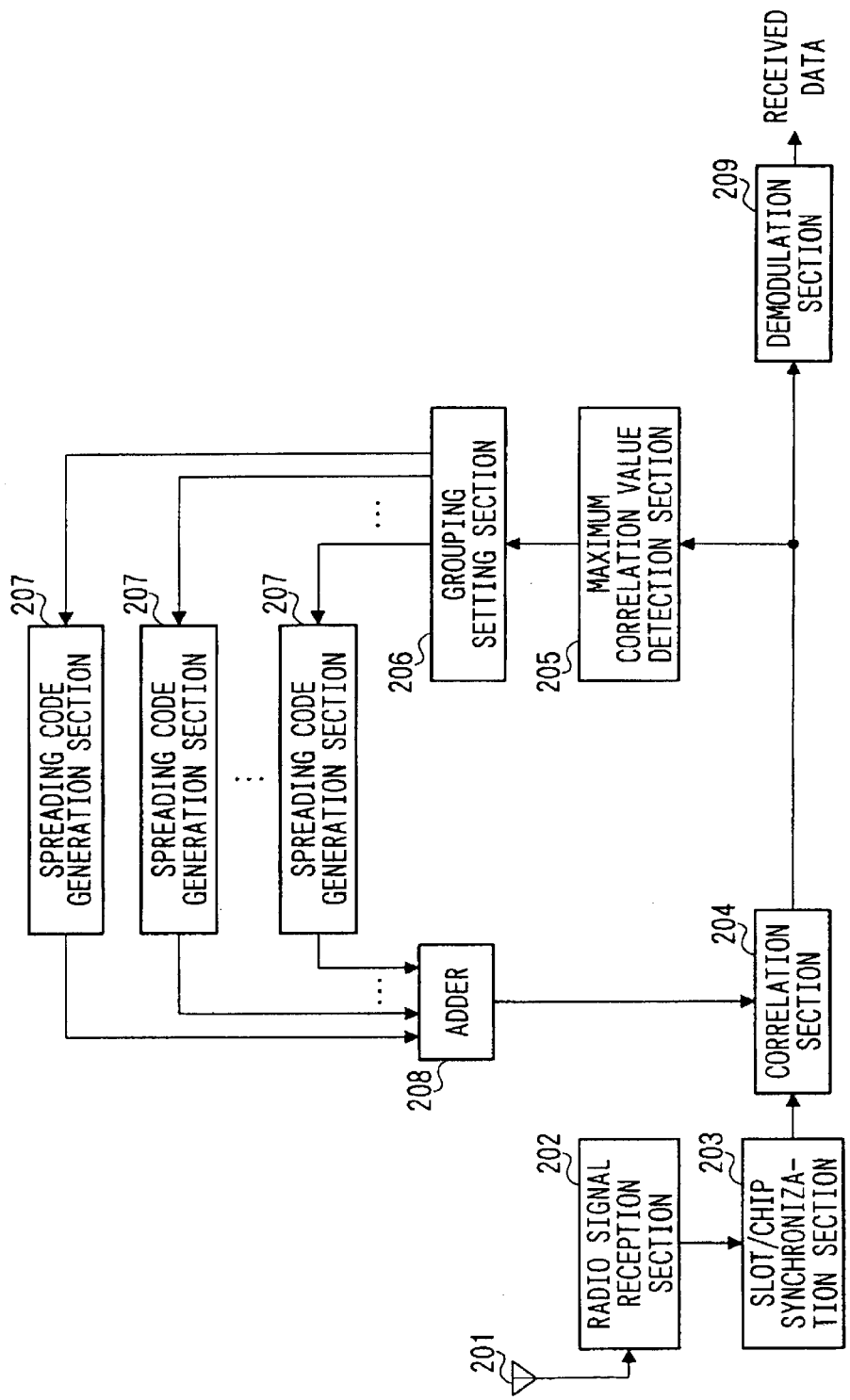
FIG. 3 is a block diagram showing a schematic configuration of a radio receiver according to the embodiment 1 of the present invention.
Figure 4:
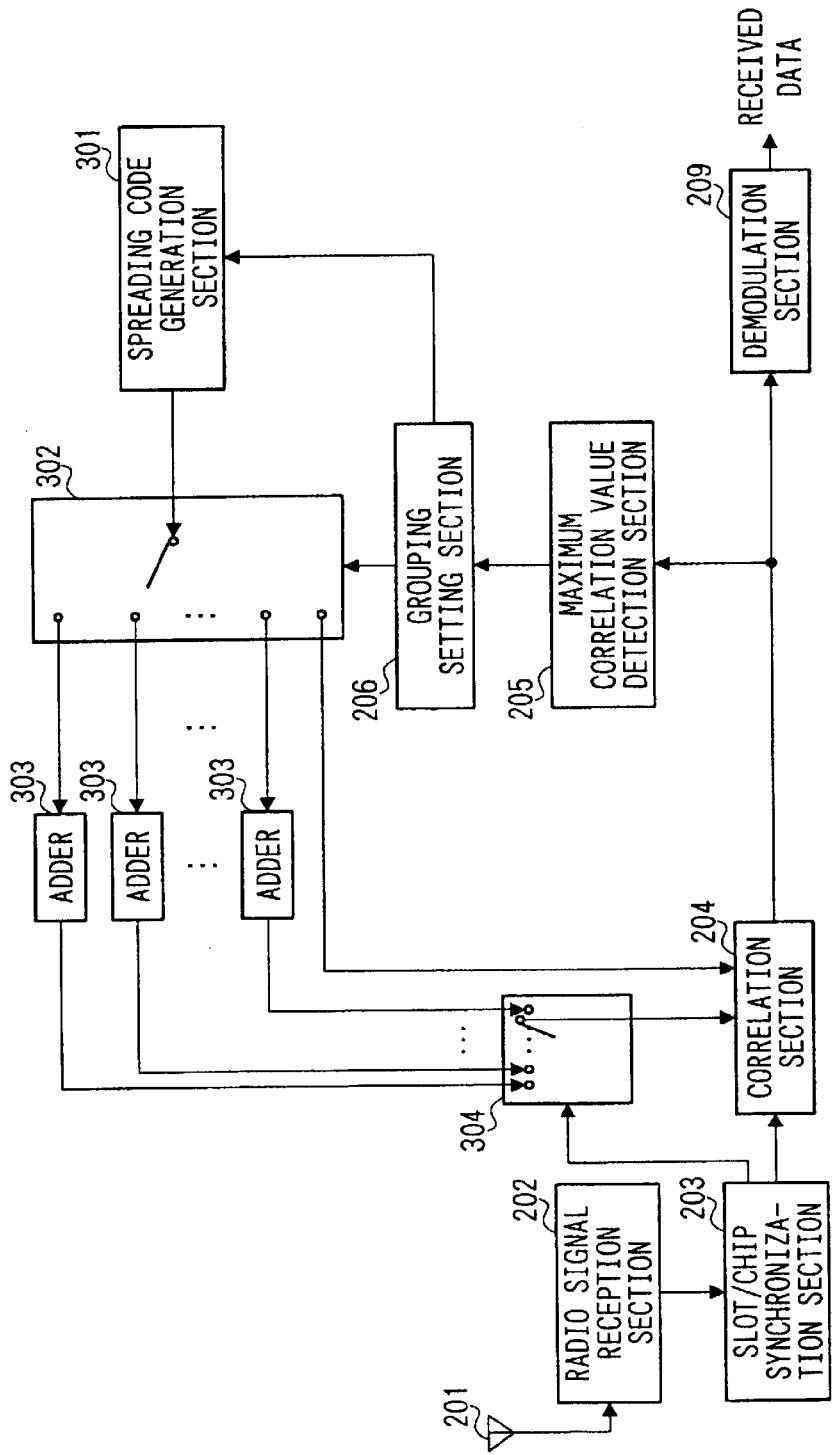
FIG. 4 is a block diagram showing another schematic configuration of the radio receiver of the embodiment 1 of the present invention.
Figure 5:
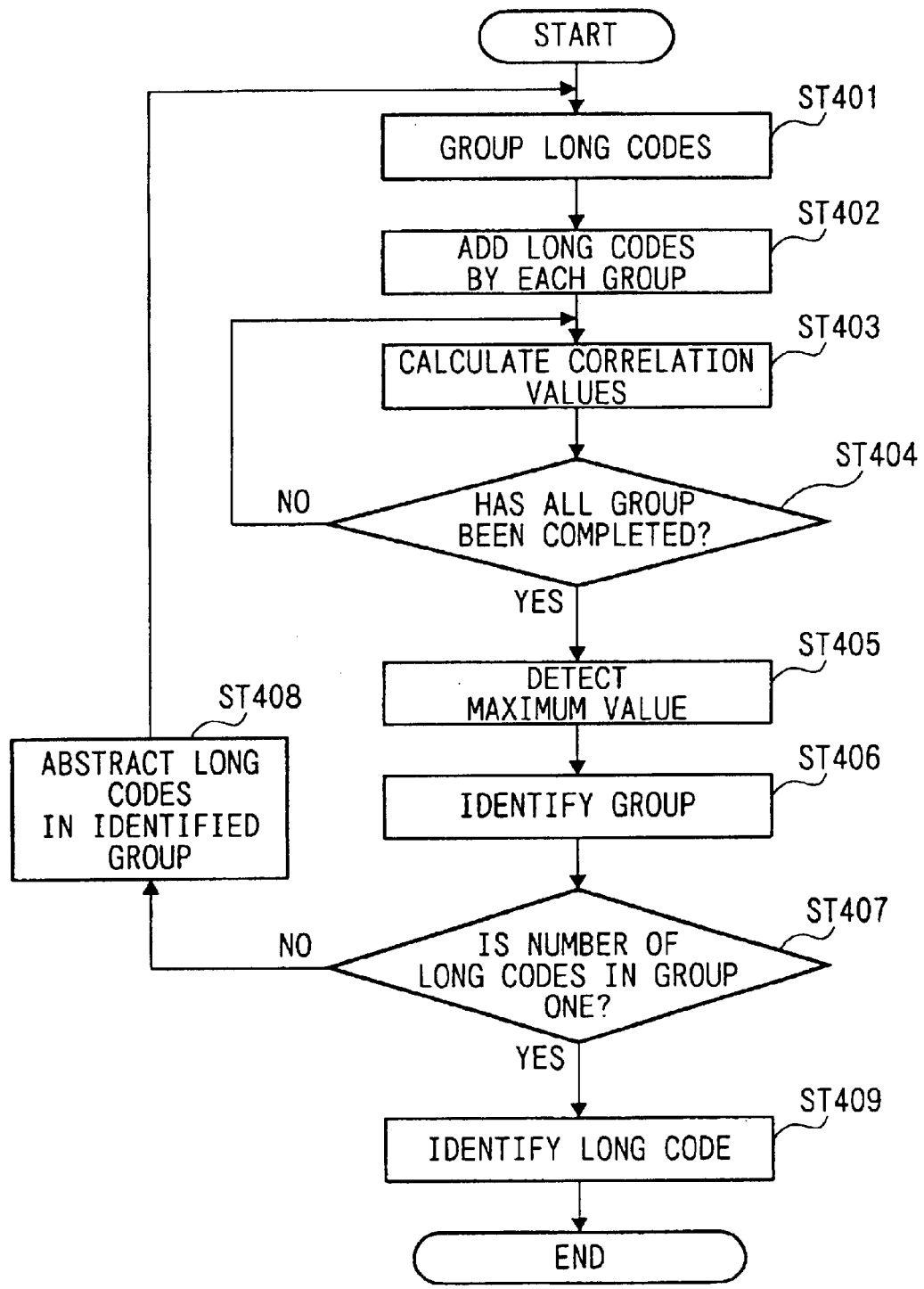
FIG. 5 is a flow chart showing an operation of the identification of a long code of the radio receiver according to the embodiment 1 of the present invention.

FIGS. 3–5 are referred in the following while the radio receiver according to the present embodiment is described. FIG. 3 is a block diagram showing a schematic configuration of the embodiment 1 of the present invention, and FIG. 4 is a block diagram showing another schematic configuration of the embodiment 1 of the present invention. FIG. 5 is a flow chart showing the operation of the identification of a long code of the radio receiver according to the embodiment 1 of the present invention.

Incidentally, the following two long code generation methods can be considerable for calculating the correlation of a plurality of long codes with a received signal. That is, A) a method in which a plurality of spreading code generation sections are equipped and a long code necessary for each correlation processing is generated one by one at the time of the correlation processing, and B) a method in which only one spreading code generation section is equipped and generated long codes are temporarily stored in a memory are considerable. FIG. 3 is referred for the description of the former method (hereinafter referred to as "generation method A"), and FIG. 4 is referred for the description of the latter method (hereinafter referred to as "generation method B"). Even if either of the two generation methods is employed, there is no influence to the operations of the identification of a long code according to the present invention.

At first, FIG. 3 is referred about the description of the case of the generation method A. In FIG. 3, an antenna 201 receives radio signals, and a radio signal reception section 202 performs the reception processing of the received signals. A slot/chip synchronization section 203 detects the timing when correlation values take the maximum value by shifting each slot of the received signals at every chip while multiplying each slot by the short code for realizing slot synchronization and chip synchronization at the same time. A correlation section 204 calculates correlation values by multiplying the received signals by addition codes input from an adder 208, which will be described later, or the identified long code.

A maximum correlation value detection section 205 stores the correlation values output from the correlation section 204 while an addition code is input from an adder 208, which will be described later, into the correlation section 204, and detects the maximum correlation value.

A grouping setting section 206 controls a plurality of spreading code generation sections 207, which will be described later, to make each spreading code generation section 207 generate a necessary long code appropriately. The grouping setting section 206 then makes each spreading code generation section 207 input the generated long code into the adder 208, and thereby performs the grouping of the long codes.

Moreover, the grouping setting section 206 selects a group having the maximum correlation value in accordance with the results of the detection of the maximum correlation value detection section 205. When only one long code exists in the group as the result of the selection, the grouping setting section 206 identifies the long code as the long code in the cell in which a link is to be connected, and instructs any one of the spreading code generation sections 207 to output the long code to the correlation section 204 through the adder 208.

The spreading code generation sections 207 store a plurality of long codes, and outputs the stored long codes to the adder 208 under the control of the grouping setting section 206. The adder 208 adds the input plural long codes at every chip to generate an addition code, and outputs the generated long code into the correlation section 4.

The demodulation section 209 obtains received data by performing the RAKE combining processing and the error correction processing of the received signals after receiving the despreading processing by means of the long code identified by the correlation section 204.

Next, FIG. 5 is referred while the operations of identifying a long code of the radio receiver according to the present embodiment configured like shown in FIG. 3 are described.

At first, at the step (hereinafter abbreivated as "ST") 401, a plurality of long codes generated by the spreading code generation sections 207 are output to the adder 208 one by one by means of the grouping setting section 206, and thereby the long codes are divided into a plurality of groups. The grouping is determined according to the output timing of each spreading code generation section 207. That is, the long codes that are added to each other by the adder 208 are grouped into the same group.

Next, at the ST 402, the long codes are added to each other in each group by the adder 208, and addition codes of each group are generated. Next, at the ST 403, the addition codes of each group generated by the adder 208 are set in the correlation section 204 in turn. The correlation section 204 then calculates the correlation values of the addition codes with received signals.

Next, at the ST 404, the maximum correlation value detection section 205 judges whether the correlation section 204 has calculated the correlation values of the addition codes of all of the groups with the received signals or not. The maximum correlation value detection section 205 repeats the judgment at the ST 403 until the correlation values of the addition codes of all of the groups have been input into the maximum correlation value detection section 205.

Next, at the ST 405, the maximum correlation value detection section 205 detects the maximum value among the correlation values of the addition codes of all the groups stored in the maximum correlation value detection section 205 temporarily. The detection result is transmitted to the grouping setting section 206.

Next, at the ST 406, the grouping setting section 206 selects a group in which an addition code indicating the maximum correlation is included as the group including the long code to be identified.

Next, at the ST 407, it is judged whether the number of the long codes included in the group selected at ST 406 is one or not. When the long codes included in the selected group are two or more, the identification operation advances to the ST 408. When the long code is one, the identification operation advances to ST 409.

At the ST 408, the long codes included in the group selected by the grouping setting section 206 at the ST 406 are abstracted. And then, the identification operation returns to the ST 401, and the grouping of the long codes abstracted at the ST 408 is again performed. Then the operations from the ST 401 to the ST 405 are repeated in the following steps until the number of the long codes selected at the ST 407 becomes one.

At the ST 409, the long code left in the group selected at the ST 406 is identified as the long code, which generates the maximum correlation value with the received signal among all of the long codes, in a cell in which a link connection is performed. Besides the long code is set in the correlation section 204 as the long code to be used in the despreading processing.

Now, it is supposed, for example, that the total number of the long codes is 512 and the number of the spreading code generation sections 207 is 64. Then, one group is constituted by 64 long codes and all of the long codes are divided into the eight groups, group 1 to group 8, at the ST 401.

Next, the long codes grouped into each group of the groups 1–8 are added in respective groups, and addition codes of respective groups 1–8 are generated at the ST 402.

Then, at the ST 403, the correlation value with a received signal is calculated as to each addition code, and at the ST 405, it is judged which correlation value is the largest among the correlation values of the groups 1–8. And then, at the ST 406, a group the correlation value of which is the largest is selected.

Because there are 64 long codes in the selected group, the identification operation advances to the ST 408 from the ST 407. At the ST 408, the 64 long codes included in the selected group are abstracted, and then at the ST 401, the division of the long codes into groups each of which include eight long codes is performed. And then, the addition of the long codes at every group, the calculation of the correlation values with the received signal, and the selection of one group are performed.

The eight long codes included in the selected group are again divided into eight groups. This time, one long code is included in each group.

In this case, the calculations of correlation values with the received signal are performed 24 times until the long code has been identified. The processes of the calculations of the correlation values decrease in comparison with the conventional case where the correlation values with a received signal are calculated one by one for all of the 512 long codes.

Next, FIG. 4 is referred while the case in which the aforesaid generation method B is used for the generation of long codes is described. Incidentally, the configurations similar to those shown in FIG. 3 are designated by the same reference numerals as those in FIG. 3, and the detailed descriptions to them are omitted.

In FIG. 4, the maximum correlation value detection section 205 stores correlation values output from the correlation section 204 while long codes are input into the correlation section 204 from a switch 304, which will be described later, and detects the maximum correlation value.

A spreading code generation section 301 stores a plurality of long codes, and outputs the stored long codes to a switch 302, which will be described later, under the control of the grouping setting section 206. The switch 302 outputs the long codes output from the spreading code generation section 301 to any of a plurality of adders 303 or the correlation section 204 under the control of the grouping setting section 206, which will be described later.

The grouping setting section 206 groups long codes by controlling the spreading code generation section 301 and the switch 302 to make the long codes output from the spreading code generation section 301 be input into any of the plural adders 303.

Besides, the grouping setting section 206 selects a group having the maximum correlation value in accordance with the results of the detection of the maximum correlation value detection section 205. When only one long code exists in the group as the result of the selection, the grouping setting section 206 identifies the long code as the long code in the cell in which a link is to be connected, and instructs the switch 302 to output the identified long code to the correlation section 204.

The adders 303 add the input plural long codes at every chip, and generate new codes to output the generated codes into the switch 304. Incidentally, the number of the adders 303 is arbitrary.

The switching of the switch 304 is controlled by the slot/chip synchronization section 203 to output the addition codes of each group, which are outputs of the plural adders 303, to the correlation section 204.

The demodulation section 209 obtains received data by performing the RAKE combining processing and the error correction processing of the received signals after receiving the despreading processing with the long code identified by the correlation section 204.

Next, FIG. 5 is referred while the operations of the identification of a long code of the radio receiver according to the present embodiment configured like shown in FIG. 4 are described.

At first, at the ST 401, all of the long codes held by the spreading code generation section 301 are divided into a plurality of groups by the grouping setting section 206. The switch 302 performs the grouping by outputting the long codes to different adders 303.

Next, at the ST 402, each adder 303 adds the long codes input into different adders 303 at every group to each other, and generates addition codes of each group.

Next, at the ST 403, the addition code of each group generated by each adder 303 is set in the correlation section 204 in turn by the switch 304, the switching of which is controlled by the slot/chip synchronization section 203. The correlation section 204 then calculates the correlation values of the addition codes with received signals.

Next, at the ST 404, the maximum correlation value detection section 205 judges whether the correlation section 204 has calculated the correlation values of the addition codes of all of the groups with the received signals or not. The maximum correlation value detection section 205 repeats the judgment at the ST 403 until the correlation values of the addition codes of all of the groups have been input into the maximum correlation value detection section 205.

Incidentally, if the number of the groups divided by the grouping setting section 206 is larger than the number of the adders 303, the adders 303 are used in conformity with the time sharing control method and the calculations of the correlation values are divided into several times of operations.

Next, at the ST 405, the maximum correlation value detection section 205 detects the maximum value among the correlation values of the addition codes of all the groups stored in the maximum correlation value detection section 205 temporarily. The detection results are transmitted to the grouping setting section 206.

Next, at the ST 406, the grouping setting section 206 selects a group in which an addition code indicating the maximum correlation is included as the group including the long code to be identified.

Next, at the ST 407, it is judged whether the number of the long codes included in the group selected at ST 406 is one or not. When the long codes included in the selected group are two or more, the identification operation advances to the ST 408. When the long code is one, the identification operation advances to ST 409.

At the ST 408, the long codes included in the group selected by the grouping setting section 206 at the ST 406 are abstracted. And then, the identification operation returns to the ST 401, and the grouping of the long codes abstracted at the ST 408 is again performed. Then the operations from the ST 401 to the ST 405 are repeated in the following steps until the number of the long codes selected at the ST 407 becomes one.

At the ST 409, the long code left in the group selected at the ST 406 is identified as the long code, which generates the maximum correlation value with the received signal among all of the long codes, in a cell in which a link connection is performed. Besides the long code is set in the correlation section 204 as the long code to be used in the despreading processing.

Now, it is supposed, for example, that the total number of the long codes is 512 and the number of the adders 303 is 16 and further the grouping of the long codes is performed into eight groups at every time. Then, at the ST 401, eight adders are used for the grouping of the long codes into eight groups, group 1–8, each of which includes 64 long codes.

Next, the long codes grouped into the groups 1–8 are added in each group, and addition codes of respective groups 1–8 are generated at the ST 402.

Then, at the ST 403, the correlation value with a received signal is calculated regarding each addition code, and at the ST 405, it is judged which correlation value is the largest among the correlation values of the groups 1–8. And then, at the ST 406, a group the correlation value of which is the largest is selected.

Because there are 64 long codes in the selected group, the identification operation advances to the ST 408 from the ST 407. At the ST 408, the 64 long codes included in the selected group are abstracted, and then at the ST 401, the division of the long codes into eight groups is again performed. And then, the addition of the long codes at every group, the calculation of the correlation values with the received signal, and the selection of one group are performed.

The eight long codes included in the selected group are again divided into eight groups. This time, one long code is included in each group.

In this case, the calculations of correlation values with the received signal are performed 24 times until the long code has been identified. The processes of the calculations of the correlation values are less than that of the conventional case where the correlation values with a received signal are calculated one by one for all of the 512 long codes.

As described above, according to the present embodiment, because long codes are identified by repeating the operations of dividing the long codes into a plurality of groups and adding the divided long codes to each other and further selecting a group having the maximum addition code among the addition code of every group, the number of the calculations of the correlation values with received signals can be decreased, and the scale of the configuration for the calculations of the correlation values can be suppressed to be the minimum size. In addition, the time necessary for identifying a long code can be shortened.

Embodiment 2

A radio receiver according to the present embodiment has a configuration similar to that of the embodiment 1. In addition, when the difference between the maximum value and the next maximum value of the correlation values of the addition codes in each group is smaller than an arbitrary threshold value, the radio receiver divides each group to increase the number of the groups, and again detects the maximum value.

Even if a long code having a high mutual correlation with a received signal is added with other long codes in a chip, the added long code can have a correlation value higher than that of a code generated by the addition of long codes having no mutual correlation with the received signal to each other. However, the peak value of the correlation values of the added long codes becomes lower than that of a single long code to be identified.

Moreover, there is a case where the long code to be identified is influenced by other long codes to weaken its correlation value. Consequently, there occurs a case where it is impossible to judge which group the long code to be identified is included to because any of the correlation values of the addition codes of every group is low in some grouping methods of the long codes, or a case where the correlation value of the addition code of a group not including the long code to be identified is the maximum correlation value in some grouping methods of the long codes.

Accordingly, the radio receiver according to the present embodiment detects the maximum correlation value again after increasing the number of groups by dividing every group when the difference between the maximum value and the next maximum value of the correlation value of the addition code of each group is equal to or less than an arbitrary threshold value.

Figure 6:
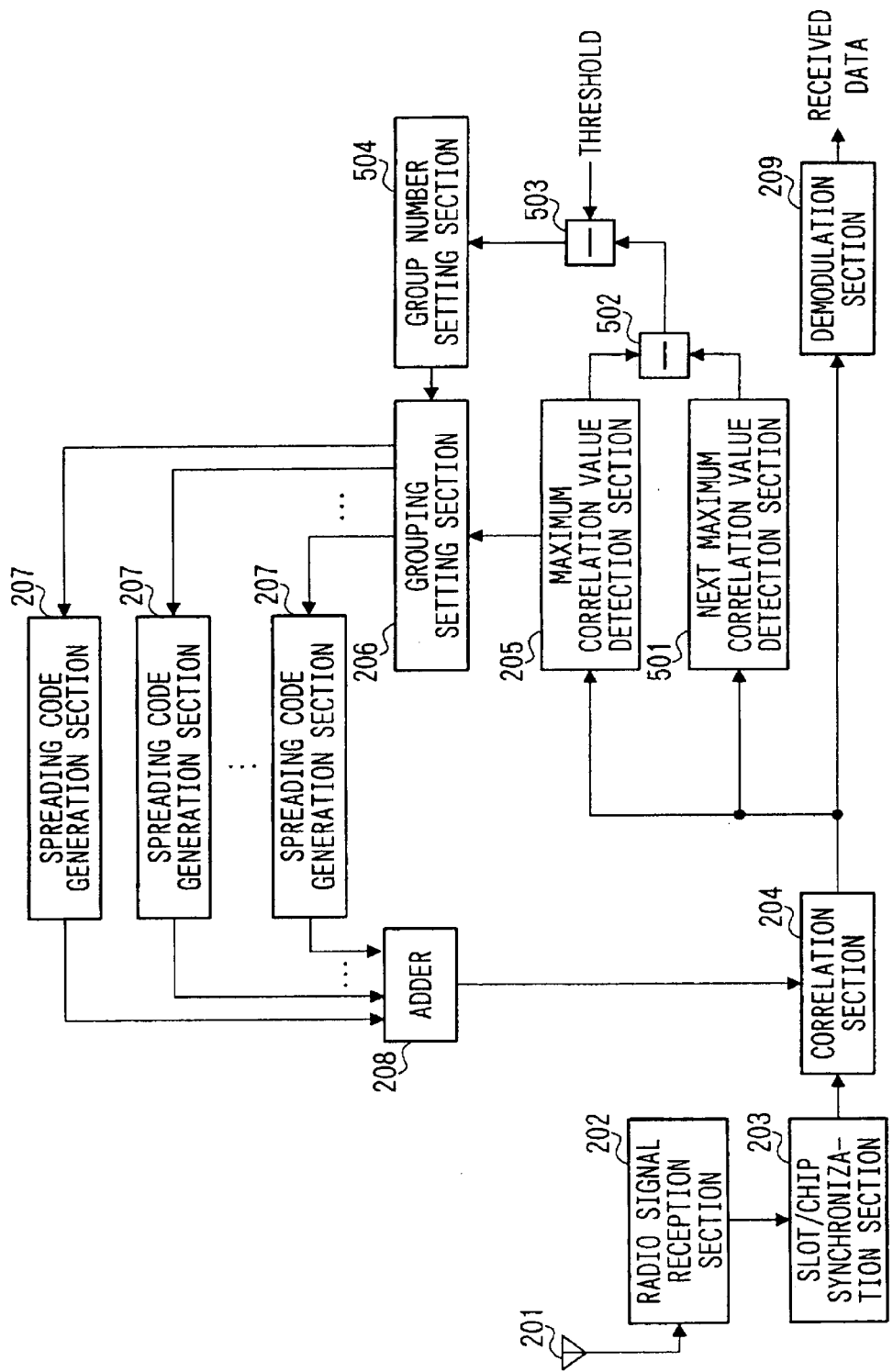
FIG. 6 is a block diagram showing a schematic configuration of a radio receiver according to the embodiment 2 of the present invention.
Figure 7:
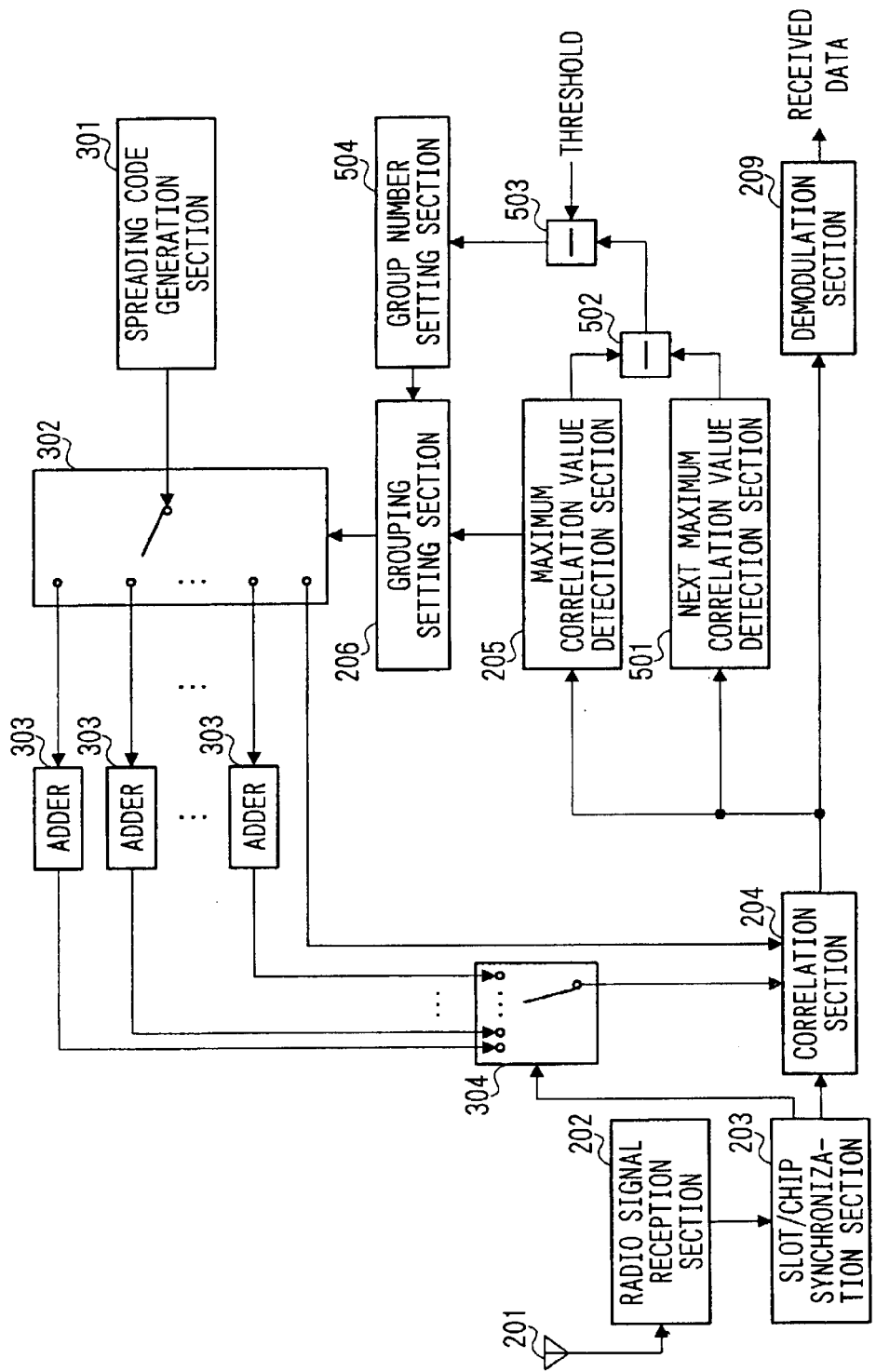
FIG. 7 is a block diagram showing another configuration of the radio receiver according to the embodiment 2 of the present invention.
Figure 8:
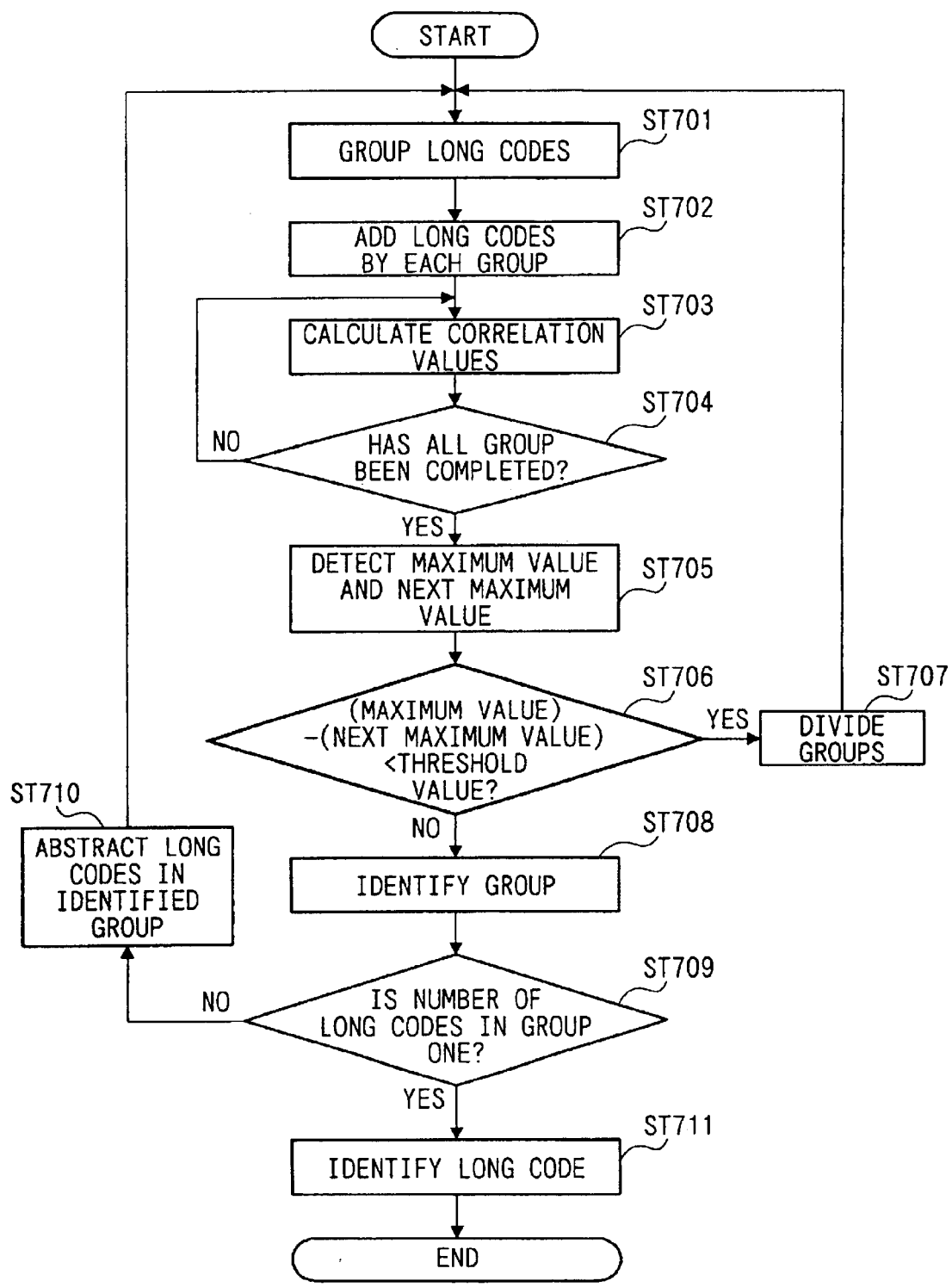
FIG. 8 is a flow chart showing the operation of the identification of a long code of the radio receiver according to the embodiment 2 of the present invention.

In the following, FIGS. 6–8 are referred while the radio receiver according to the present embodiment is described. FIG. 6 is a block diagram showing a schematic configuration of the embodiment 2 of the present invention, and FIG. 7 is a block diagram showing another schematic configuration of the embodiment 2 of the present invention. FIG. 8 is a flow chart showing the operations of the identification of a long code of the radio receiver according to the embodiment 2 of the present invention. Incidentally, the configurations similar to those of the embodiment 1 are designated by the same reference marks as those in the embodiment 1, and their detailed descriptions are omitted.

At first, FIG. 6 is referred about the description in the case where the generation of long codes is performed in conformity with the aforesaid generation method A. In FIG. 6, a next maximum correlation value detection section 501 operates in parallel with the maximum correlation value detection section 205 when the maximum correlation value detection section 205 is operating. The next maximum correlation value detection section 501 temporarily stores correlation values of additional codes of the whole group output from the correlation section 204, and detects the second largest value among the stored correlation values.

A subtracter 502 performs the subtraction processing between the maximum value among the correlation values of the addition codes of the whole group output from the maximum correlation value detection section 205 and the next maximum value among the correlation values of the addition codes of the whole group output from the next maximum correlation value detection section 501. The subtracter 503 performs the subtraction processing between the differences between the maximum correlation values and the next maximum correlation values output from the subtracter 502 and an arbitrary threshold value.

A group number setting section 504 judges the subtraction results of the subtracter 503, and instructs the grouping setting section 206 to increase the number of groups by dividing each group when the difference is smaller than the threshold value, and instructs nothing to the grouping setting section 206 when the difference is larger than the threshold value.

It is possible to increase the number of the groups by decreasing the number of the spreading code generation sections 207 that is operated to decrease the number of the long codes to be added at the same time in the adder 208, and by increasing the number of times of the addition processing.

Next, FIG. 8 is referred while the operation of identifying a long code of the radio receiver according to the present embodiment is described. In FIG. 8, the ST 701 to ST 704 are the same as the corresponding steps in FIG. 4 concerning the embodiment 1, consequently the descriptions about them are omitted.

At the ST 705, the maximum correlation value detection section 205 and the next maximum correlation value detection section 501 detect the maximum correlation value and the next maximum correlation value among the correlation values of the addition codes at every group calculated by the correlation section 204.

Next, at the ST 706, the subtracter 502 and the subtracter 503 judges which is larger of the difference between the maximum value and the next maximum value in the correlation values of the addition codes at every detected group and an arbitrary threshold value.

When it is judged that the difference between the maximum value and the next maximum value is smaller than the threshold value in the judgment at the ST 706, the detection of a peak is judged to be impossible, and the identification operation advances to the ST 707. At the ST 707, the group number setting section 504 instructs the grouping setting section 206 to divide each group to increase the number of the groups and to begin the detection of the maximum value again.

For example, if eight groups at that time are divided into sixteen groups, the number of the long codes included in each group decreases to a half of the original number, and the influence of other long codes by addition to the long code to be identified decreases. Consequently, the peak becomes easy to detect.

When the difference between the maximum value and the next maximum value is larger than the threshold value at the judgment at the ST 706, it is judged that a peak has been detected, and the identification operation advances to the ST 708. At the ST 708, a group the addition code of which takes the maximum value is selected as the group including the long code to be identified. The following processes from the ST 709 to the ST 711 are the same as those of the ST 407 to the ST 409 in FIG. 4 concerning the embodiment 1, consequently, their descriptions are omitted. Incidentally, the increasing procedures of the number of groups by the division of each group are repeated until the difference between the maximum value and the next maximum value becomes smaller than the threshold value.

Furthermore, FIG. 6 shows a configuration in which the aforesaid generation method B is used for the generation of long codes. Because each configuration and each operation are the same as those of the aforesaid configuration, the detailed description thereof is omitted.

As described above, the present embodiment judges that a peak is not detected when the difference between the maximum value and the next maximum value of the correlation values of the addition codes at every group is smaller than an arbitrary threshold value, and divides each group to increase the number of groups and to decrease the number of the long codes included in each group, and then detects the maximum correlation value again. Consequently, the embodiment can precisely detect a peak, and then can precisely detect a long code to be identified.

Incidentally, in the description of the radio receiver according to the present embodiment, the description has been given to a case where the maximum correlation value detection section 205 and the next maximum correlation value detection section 501 are provided separately, but they may be realized as the same component as long as the maximum value and the next maximum value can be detected.

Embodiment 3

The radio receiver according to the present embodiment has a configuration similar to that of the embodiment 2. But, the embodiment changes the combination of the long codes included in each group and detects the maximum value again when the difference between the maximum value and the next maximum value of the correlation value of the addition code of each group is smaller than an arbitrary threshold value.

Even if a long code having a high mutual correlation with a received signal is added with other long codes at every chip, the added long code can have a correlation value higher than that of a code generated by the addition of long codes having no mutual correlation with the received signal to each other. However, the peak value of the correlation values of the added long codes becomes lower than that of a single long code to be identified.

Moreover, there is a case where the long code to be identified is influenced by other long codes to weaken its correlation value. Consequently, there occurs a case where it is impossible to judge which group the long code to be identified is included to because any of the correlation values of the addition codes of every group is low in some grouping methods of the long codes, or a case where the correlation value of the addition code of a group not including the long code to be identified is the maximum correlation value in some grouping methods of the long codes.

Accordingly, the radio receiver according to the present embodiment detects the maximum correlation value again after grouping the long codes again when the difference between the maximum value and the next maximum value of the correlation value of the addition code of each group is equal to or less than an arbitrary threshold value.

Figure 9:
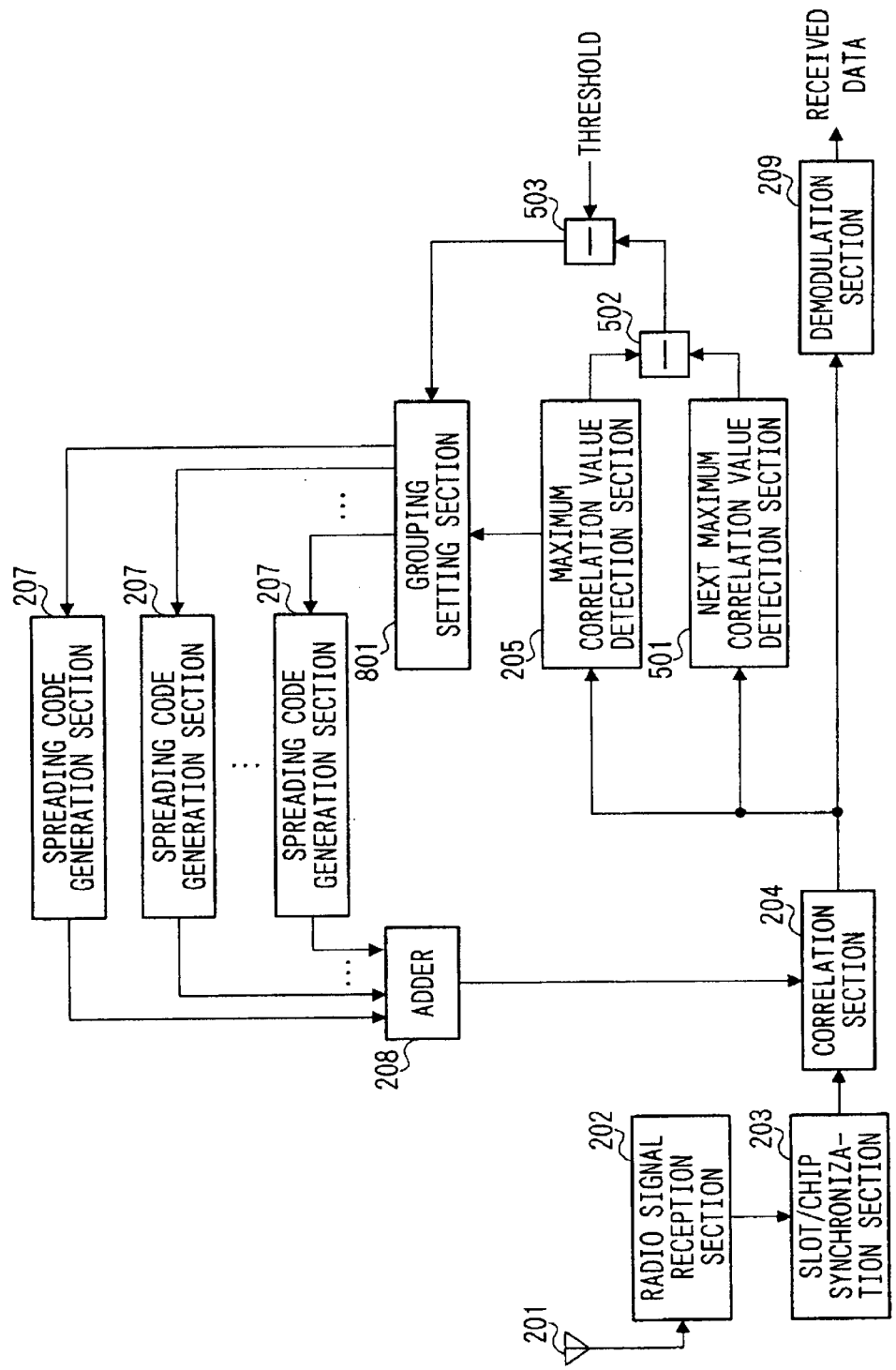
FIG. 9 is a block diagram showing a schematic configuration of a radio receiver according to the embodiment 3 of the present invention.
Figure 10:
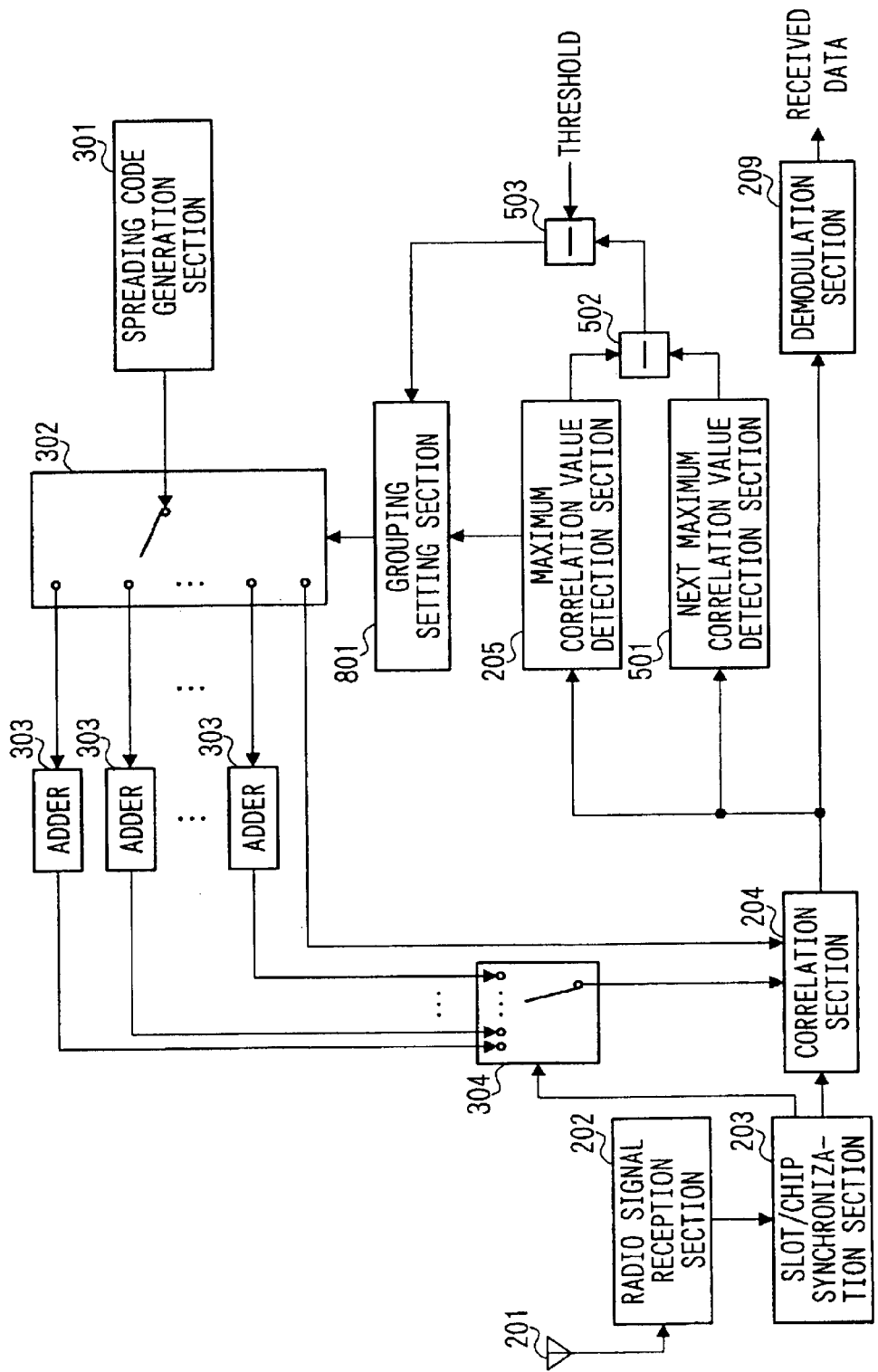
FIG. 10 is a block diagram showing another schematic configuration of the radio receiver according to the embodiment 3 of the present invention.
Figure 11:
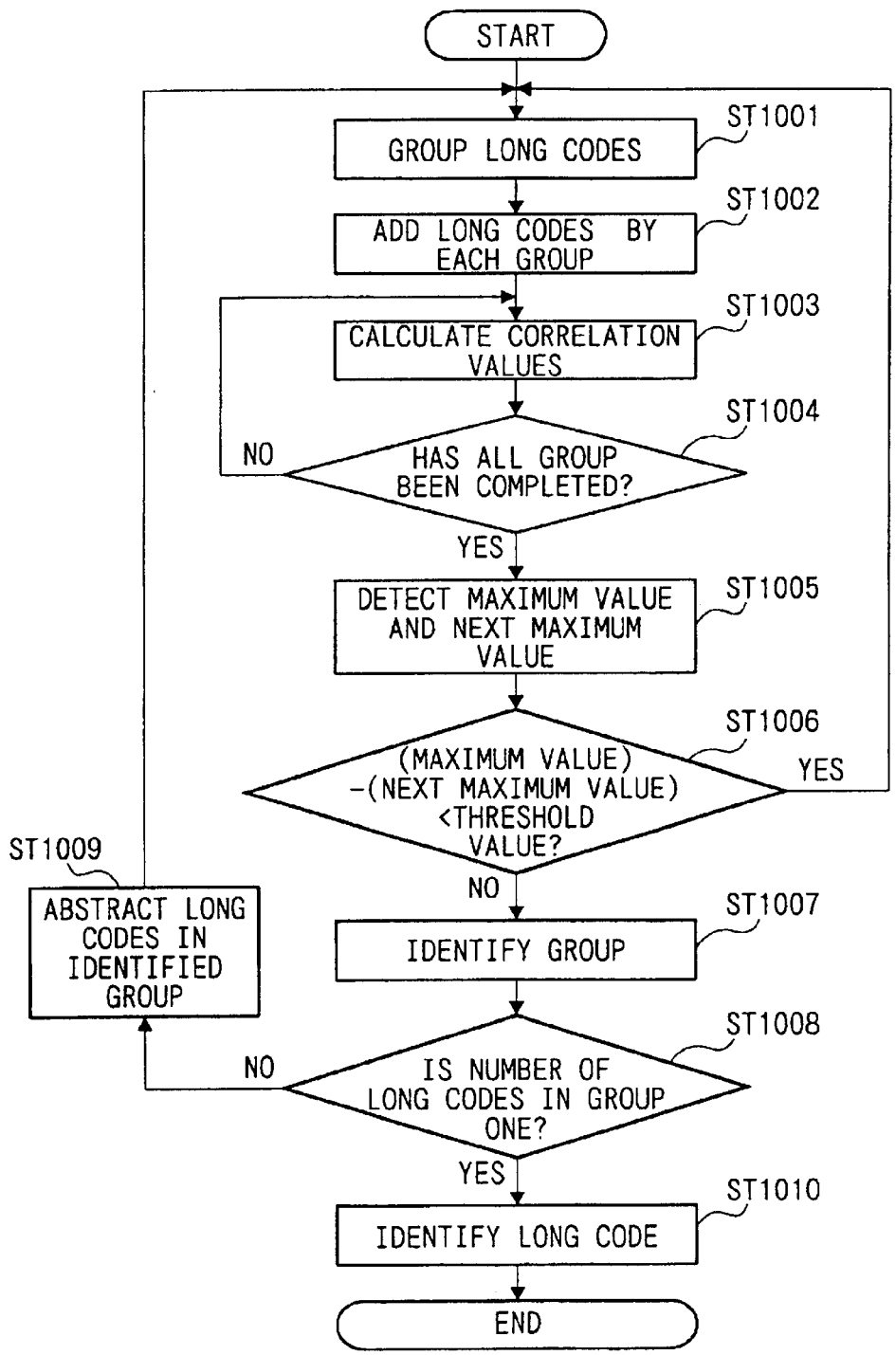
FIG. 11 is a flow chart showing the operation of the identification of a long code of the radio receiver according to the embodiment 3 of the present invention.
Figure 1:
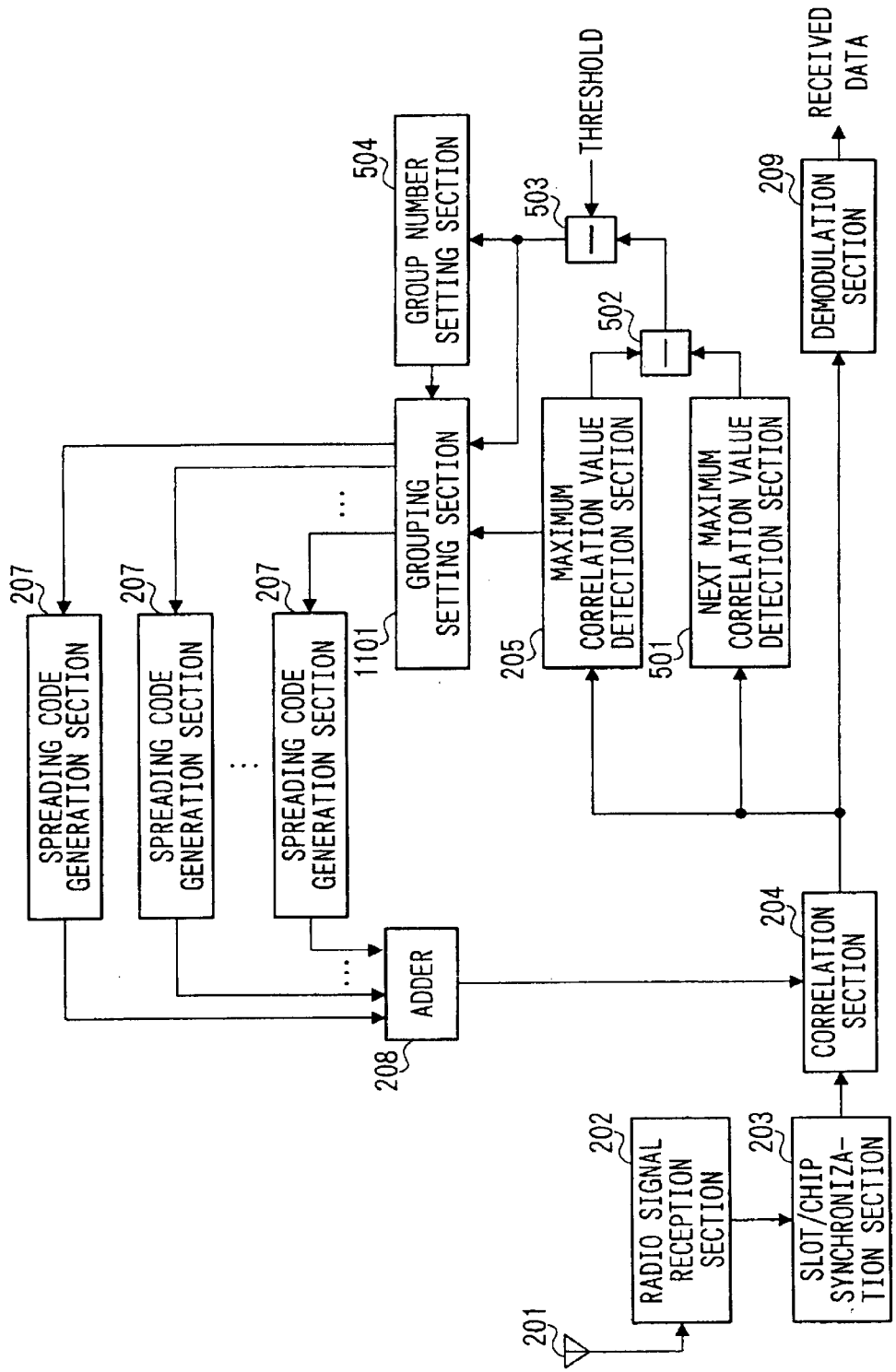

FIGS. 9–11 are referred in the following while the radio receiver according to the present embodiment is described. FIG. 9 is a block diagram showing a schematic configuration of a radio receiver according to the embodiment 3 of the present invention, and FIG. 10 is a block diagram showing another schematic configuration of the radio receiver according to the embodiment 3 of the present invention. FIG. 11 is a flow chart showing the operation of the identification of a long code of the radio receiver according to the embodiment 3 of the present invention. Incidentally, the configurations similar to those of the embodiment 2 are designated by the same reference marks, and their detailed descriptions are omitted.

At first, FIG. 9 is referred about the description of a case where long codes are generated in conformity with the aforementioned generation method A. In FIG. 9, a grouping setting section 801 changes the combination of long codes so that the long codes included in each group are changed while not changing the number of groups when the difference between the maximum value and the next maximum value of the correlation value of the addition code of each group is smaller than a threshold value, and the grouping setting section 801 selects a group to which a long code to be identified belongs when the difference between the maximum value and the next maximum value is larger than the threshold value.

The changes of the combinations of long codes are performed in conformity with the instructions and the control of the grouping setting section 801 to the spreading code generation sections 207 to change the generation order of spread codes.

Next, FIG. 11 is referred while the operation of the identification of long codes of the radio receiver according to the present embodiment is described. In FIG. 11, because the operations from the ST 1001 to the ST 1005 are the same as those at the ST 701 to ST 705 in FIG. 8 concerning the embodiment 2, the descriptions of the operations from the ST 1001 to the ST 1005 are omitted.

At the ST 1006, the subtracter 503 judges which is larger of the difference between the maximum correlation value and the next maximum correlation value, the difference being output from the subtracter 502, and an arbitrary threshold value.

When the difference is smaller than the threshold value at the ST 1006, it is judged that the detection of a peak is impossible, and the identification operation returns to the ST

1001. In this case, no group is selected, namely the number of the groups is not changed, and then the grouping is again started by the grouping setting section 801, and consequently the combinations of long codes included in each group are changed.

Because long codes to be added to a long code to be identified are changed when the combinations of the long codes included in each group are changed, if a long code that has weakened the mutual correlation of the long code to be identified moves to a group different from the group to which the long code to be identified belongs, the mutual correlation of the long code to be identified emerges in the correlation value of the addition code, and thereby a peak becomes possible to be detected.

When the maximum value is larger than the threshold value at the ST 1006, it is judged that a peak has been detected. Then, the identification operation advances to the ST 1007, and a group the addition code of which exhibits the maximum value is selected as the group including the long code to be identified. Because the processing from the ST 1008 to the ST 1010 is the same as that of the ST 709 to ST 711 in FIG. 8 concerning the embodiment 2, the description of the processing is omitted. Incidentally, the re-grouping is repeated until the maximum value becomes larger than the threshold value.

Furthermore, a configuration in the case where the aforesaid generation method is used for the generation of the long codes is shown in FIG. 10. Each configuration and its operation are the same as the already described configuration, and consequently the detailed description of the configuration is omitted.

As described above, according to the present embodiment, it is judged that no peak is detected when the difference between the maximum value and the next maximum value of the correlation value of the addition code at every group is smaller than an arbitrary threshold value, and the grouping of long codes is again started for the detection of the maximum correlation value after the combinations of the long codes included in each group has been changed, and consequently a peak can precisely be detected, and thereby the long code to be identified can precisely be detected.

Incidentally, the number of the long codes to be replaced and the method of the replacement at the time of the replacement of the long codes included in each group are quite arbitrary.

Embodiment 4

A radio receiver according to the present embodiment has a configuration similar to that of the embodiment 1. In addition, when the difference between the maximum value and the next maximum value of the correlation value of the addition code in each group is smaller than an arbitrary threshold value, the radio receiver divides each group to increase the number of the groups. Or, when the difference between the maximum value and the next maximum value of the correlation value of the addition code in each group is smaller than an arbitrary threshold value, the radio receiver changes the combinations of long codes included in each group, and again detects the maximum value.

Figure 13:
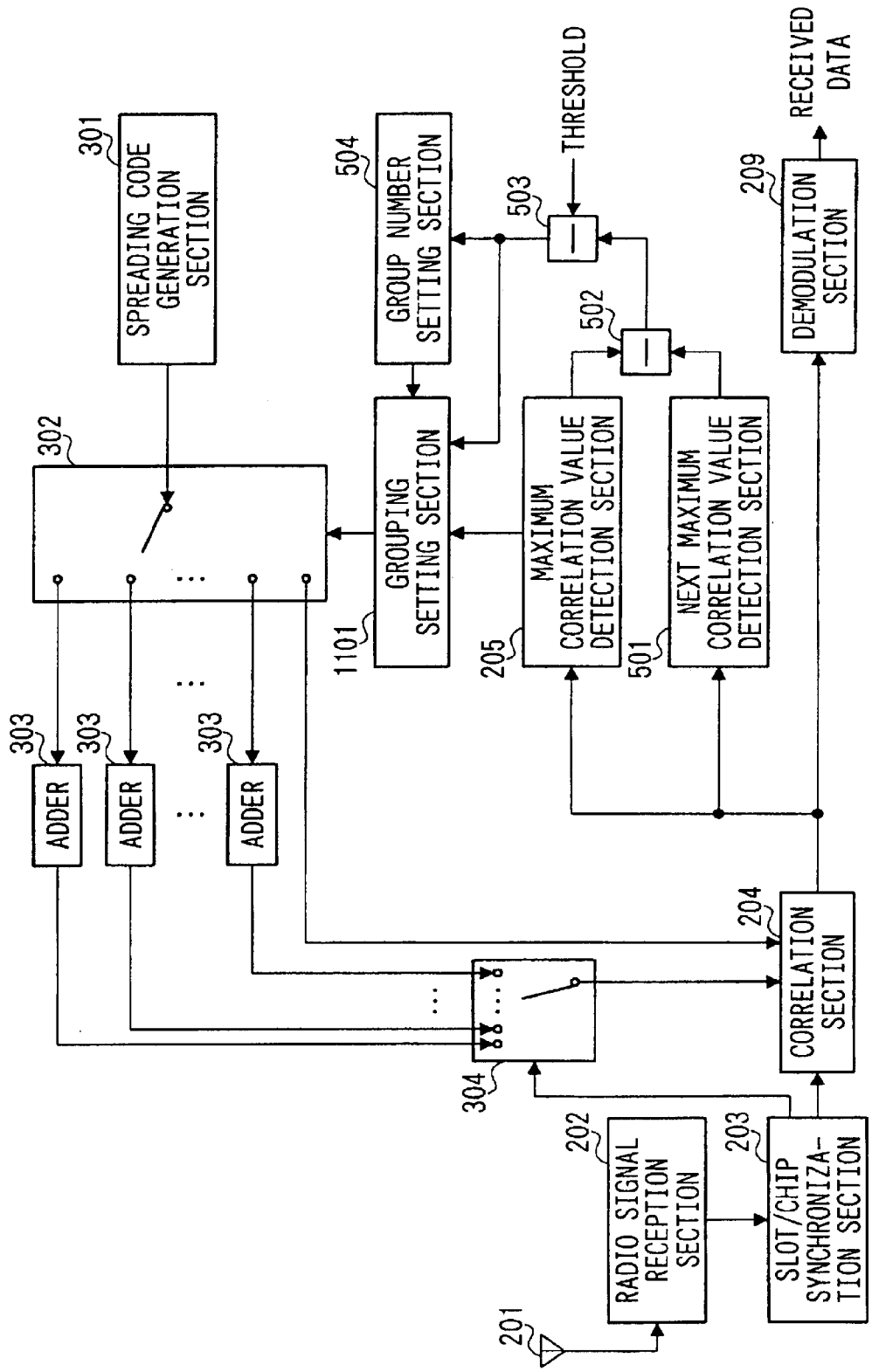
FIG. 13 is a block diagram showing another schematic configuration of the radio receiver according to the embodiment 4 of the present invention.

Hereinafter, FIG. 12 and FIG. 13 are referred while the radio receiver according to the present invention is described. FIG. 12 is a block diagram showing a schematic configuration of the receiver according to the embodiment 4 of the present invention, and FIG. 13 is a block diagram showing another schematic configuration of the receiver according to the embodiment 4 of the present invention.

Incidentally, the configurations similar to those of the embodiment 2 and the embodiment 3 are designated by the same reference marks as those in the embodiments 2 and 3, and the detailed descriptions of the configurations are omitted.

At first, FIG. 12 is referred about the description in the case where the generation of long codes is performed in conformity with the aforesaid generation method A. In the radio receiver according to the present embodiment, likewise the embodiment 2, the subtracter 502 performs the subtraction processing of the maximum value of the correlation value of the addition code in each group output from the maximum correlation value detection section 205 and the next maximum value output from the next maximum correlation value detection section 501, and the subtracter 503 performs the subtraction processing of outputs from the subtracter 502 and an arbitrary threshold value. When the difference between the maximum value and the next maximum value is equal to the threshold value or less, the group number setting section 504 instructs a grouping setting section 1101 to divide each group to increase the number of groups and to perform the detection of the maximum correlation value again.

Or, in the radio receiver according to the present embodiment, likewise in the embodiment 3, the subtracter 502 performs the subtraction processing of the maximum value of the correlation value of the addition code in each group output from the maximum correlation value detection section 205 and the next maximum value output from the next maximum correlation value detection section 501, and the subtracter 503 performs the subtraction processing of outputs from the subtracter 502 and an arbitrary threshold value. When the difference between the maximum value and the next maximum value is equal to the threshold value or less, a grouping setting section 1101 changes the combinations of long codes by replacing the long codes included in each group, and the maximum correlation value is again detected.

Moreover, a configuration in a case where the aforesaid generation method B is used for the generation of long codes is shown in FIG. 13. Each configuration and operation are similar to the already described each configuration, their detailed descriptions are omitted.

As described above, the radio receiver according to the present embodiment performs both of or either of the division of each group and the replacement of long codes included in each group when no peak value is detected from the correlative value of the addition code of each group, and consequently, the selection of a group including a long code to be identified can be performed more efficiently, and thereby the time necessary for the identification of the long code can be shortened.

Incidentally, in the aforementioned embodiments 1–4, the number of the long codes is set to be the n-th power of 2 because in almost all the case the number of the long codes is the n-th power of 2. However, the present invention is not limited to the application of the condition, but the present invention can be applied to such a case where the total number of the long codes is odd, and the number of the long codes included in each group is consequently not uniform. Moreover, it is similarly not necessary that the number of the groups is an even number.

Furthermore, in the aforesaid embodiments 1–4, the descriptions are given to a case where all groups are divided into just half of them to double their numbers when they are grouped. However, the application of the present invention is not restricted to the aforesaid condition, but it is not necessary to divide all of the groups. Moreover, it is also not necessary to divide them evenly. However, it is preferable that all of the groups are divided evenly.

Furthermore, in the aforesaid embodiments 1–4, the descriptions are given to a case where only one correlation section is equipped, but two or more correlation sections may be equipped for the sake of the shortening of the time necessary for identifying long codes. However, because it can considerable that the time can be shortened enough by the method for the identification of long codes according to the present invention, it is more preferable to minimize the scale of its hardware by suppressing the configuration for calculating correlation values to be minimum.

Furthermore, in the aforesaid embodiments 1–4, the descriptions are given to a case where two kinds of spreading codes, long codes and short codes, are used, but the application of the present invention is not limited to the case. That is, the present invention can always be applied to the cases where a base station intrinsic spreading code to be connected with a link is identified among a plurality of spreading codes.

Furthermore, in the aforesaid embodiments 3 and 4, the descriptions are given to the cases where the replacement is performed when the difference between the maximum correlation value and the next maximum correlation value is smaller than an arbitrary threshold value. However, it is also possible to perform the replacement when the maximum correlation value is smaller than the arbitrary threshold value.

Furthermore, it is also possible that the radio receiver of the present invention is applied to a communication system such as M-array spectrum spreading communication in which transmission data and reception data are modulated and demodulated on the basis of the distinction of the kinds of spreading codes.

A radio receiver of the present invention comprising: an addition spreading code generation section for dividing an input spreading code group into at least two groups and adding spreading codes included in each group to each other at every chip to generate new spreading codes; a group selection section for calculating correlation values between each of the spreading codes generated by the addition spreading code generation section and a received signal and selecting a group having a maximum correlation value among the calculated correlation values, and a control section for judging whether a number of spreading codes included in the group selected by the group selection section is one or not, and inputting all of the spreading codes included in the selected group into the spreading code generation section when the number of the spreading codes is two or more, and further setting the spreading codes included in the selected group to be used at despreading processing to the received signal when the number of the spreading codes is one.

According to the configuration, a long code is identified by repeating the division of the long codes into a plurality of groups, the addition of the divided long codes to each other, and the selection of a group indicating the maximum correlation value among the addition code of each group. Consequently, the number of times of the calculations of the correlation values with a received signal can be decrease. Thereby, the configuration for calculating the correlation values can be suppressed to the minimum scale, and moreover the time necessary for the identification of a long code can be shortened.

The radio receiver of the present invention employs a configuration in the aforesaid configuration, wherein the addition spreading code generation section includes a division section for dividing at least one group among each of the groups after being grouped at every arbitrary number of the spreading codes to increase a number of groups, and the group selection section includes a subtraction processing section for calculating a next maximum correlation value being largest next to the maximum correlation value and a difference between the next maximum correlation value and the maximum correlation value, and a division instruction section for instructing the division section to perform division when the difference is smaller than an arbitrary threshold value.

According to the configuration, a peak is judged not to be detected when the difference between the maximum value and the next maximum value of the correlation value of the addition code in each group is smaller than an arbitrary threshold value, and each group is divided so that the number of groups is increased and the number of long codes included in each group is decreased. And then, the maximum correlation value is again detected. Consequently, the peak can accurately be detected, and the long code to be identified can correctly be detected.

The radio receiver according to the present invention employs a configuration in the aforesaid configuration, wherein the addition spreading code generation section includes a spreading code replacement section for changing a combination of the spreading codes included in each of the groups after being grouped, the group selection section includes a subtraction processing section for calculating a next maximum correlation value being a correlation value largest next to the maximum correlation value and a difference between the next maximum correlation value and the maximum correlation value, and a replacement instruction section for instructing the spreading code replacement section to perform the replacement when the difference is smaller than an arbitrary threshold value.

According to the configuration, a peak is judged not to be detected when the difference between the maximum value and the next maximum value of the correlation value of the addition code in each group is smaller than an arbitrary threshold value, and the combination of the long codes included in each group is changed, and grouping is again started of the detection of the maximum correlation value again. Consequently, the peak can accurately be detected, and the long code to be identified can correctly be detected.

The radio receiver according to the present invention employs a configuration in the aforesaid configuration, wherein the addition spreading code generation section includes a division section for dividing at least one group among each of the groups after being grouped at every arbitrary number of the spreading codes to increase a number of the groups and a spreading code replacement section for changing combinations of the spreading codes included in each of the groups after being grouped or being divided, and the group selection section includes a subtraction processing section for calculating a next maximum correlation value being a correlation value largest next to the maximum correlation value and calculating a difference between the next maximum correlation value and the maximum correlation value, a division instruction section for instructing the division section to perform the division when the difference is smaller than an arbitrary threshold value, and a replacement instruction section for instructing the spreading code replacement section to perform the replacement when a difference between the next maximum correlation value and the maximum correlation value is smaller than an arbitrary threshold value.

According to the configuration, when a peak is not detected in the correlation value of the addition code of each group, at least either of the division of each group and the replacement of the long codes included in each group for increasing the number of groups is performed. Consequently, the selection of a group including a long code to be identified can be performed more efficiently, and then the time necessary for the identification of the long code can be shortened.

A method for identifying a spreading code according to the present invention comprising: an addition spreading code generation step for dividing a spreading code group into at least two groups and adding spreading codes included in each group to each other at every chip to generate new spreading codes; a group selection step for calculating correlation values between each of the spreading codes generated by the addition spreading code generation means and a received signal and selecting a group having a maximum correlation value among the calculated correlation values, and a control step for judging whether a number of spreading codes included in the group selected at the group selection step is one or not, and returning all of the spreading codes included in the selected group into the addition spreading code generation step when the number of the spreading codes is two or more, and further setting the spreading codes included in the selected group to be used at despreading processing to the received signal when the number of the spreading code is one.

According to the method, because the long codes are divided into a plurality of groups to be added to each other, and a group indicating the maximum correlation value among addition code of each group is selected, and further these procedures are repeated to identify the long code, the number of times of the calculation of correlation values with a received signal can be decreased, and thereby the configuration for calculating the correlation values can be suppressed to be the minimum scale and the time necessary for the identification of the long code can be shortened.

The method for identifying a spreading code according to the present invention in the aforesaid method, wherein in the group selection step, a next maximum correlation value being a correlation value largest next to the maximum correlation value is calculated, and a difference between the next maximum correlation value and the maximum correlation value is calculated, and further the addition spreading code generation step is controlled so that at least one group of each of the groups after being grouped is divided at every arbitrary number of the spreading codes to increase a number of the groups when the difference is smaller than an arbitrary threshold value.

According to the method, when the difference between the maximum value and the next maximum value of the correlation value of the addition code in each group is smaller than an arbitrary threshold value, a peak is judged not to be detected, and each group is divided. Thereby the number of the groups increases, and the number of the long codes included in each group decreases. After that, the maximum correlation value is again detected. Consequently, the detection of the peak can precisely be performed, and the long code to be identified can correctly be detected.

The method for identifying a spreading code according to the present invention in the aforesaid method, wherein in the group selection step, the addition spreading code generation step is controlled so that combinations of the spreading codes included in each of the groups after being grouped are changed when the difference between the next maximum correlation value and the maximum correlation value is smaller than an arbitrary threshold value.

According to the method, when the difference between the maximum value and the next maximum value of the correlation value of the addition code in each group is smaller than an arbitrary threshold value, a peak is judged not to be detected, and the combination of long codes included in each group is changed for the re-grouping of the long codes. And then the maximum correlation value is again detected. Consequently, the detection of the peak can precisely be performed, and the long code to be identified can correctly be detected.

The method for identifying a spreading code according to the present invention in the aforesaid method, wherein in the group selection step, a next maximum correlation value being a correlation value largest next to the maximum correlation value is calculated, and a difference between the next maximum correlation value and the maximum correlation value is calculated, and increase of a number of the groups by dividing at least one group of each of the groups after being grouped at every arbitrary number of the spreading codes is instructed when the difference is smaller than an arbitrary threshold value, and/or change of combinations of the spreading codes included in each of the groups after being grouped or after being divided is instructed when the difference between the next maximum correlation value and the maximum correlation value is smaller than the arbitrary threshold value.

According to the method, when a peak is not detected in the correlation value of the addition code of each group, at least one of the procedures of the division of each group for the increase of the number of groups and the replacement of the long codes included in each group is performed. Consequently, the selection of a group including a long code to be identified can be performed more efficiently, and the time necessary for the identification of the long code can be shortened.

As described above, according to the present invention, because a long code is identified by repeating the grouping and the narrowing down of a long code group being the prospective long code to be identified, the configuration for calculating correlation values can be suppressed to be the minimum scale, and the time necessary for identifying a long code can be shortened.

This application is based on the Japanese Patent Application No. HEI 11-169698 filed on Jun. 16, 1999, entire content of which is expressly incorporated by reference herein.

Industrial Applicability

The present invention can be applied to a communication terminal or a base station apparatus in a digital radio communication system. According to these configurations, in an opponent station of communication, a long code is identified by repeating the grouping and the narrowing down of a long code group being a prospective long code to be identified. Consequently, the configuration for calculating correlation values can be suppressed to be the minimum scale, and the time necessary for identifying the long code can be shortened.

What is claimed is:

1. A radio receiver comprising:
addition spreading code generation means for dividing an input spreading code group into at least two groups and adding spreading codes included in each group to each other at every chip to generate new spreading codes;

group selection means for calculating correlation values between each of the spreading codes generated by said addition spreading code generation means and a received signal and selecting a group having a maximum correlation value among the calculated correlation values, and control means for judging whether a number of spreading codes included in the group selected by said group selection means is one or not, and inputting all of the spreading codes included in the selected group into said addition spreading code generation means when the number of the spreading codes is two or more, and further setting the spreading codes included in the selected group to be used at despreading processing to the received signal when the number of the spreading code is one.

2. The radio receiver according to claim 1, wherein said addition spreading code generation means includes a division section for dividing at least one group among each of the groups after being grouped at every arbitrary number of the spreading codes to increase a number of groups, and said group selection means includes a subtraction processing section for calculating a next maximum correlation value being largest next to the maximum correlation value and a difference between the next maximum correlation value and the maximum correlation value, and a division instruction section for instructing the division section to perform division when the difference is smaller than an arbitrary threshold value.

3. The radio receiver according to claim 1, wherein said addition spreading code generation means includes a spreading code replacement section for changing a combination of the spreading codes included in each of the groups after being grouped, said group selection means includes subtraction processing section for calculating a next maximum correlation value being a correlation value largest next to the maximum correlation value and a difference between the next maximum correlation value and the maximum correlation value, and a replacement instruction section for instructing the spreading code replacement section to perform the replacement when the difference is smaller than an arbitrary threshold value.

4. The radio receiver according to claim 1, wherein said addition spreading code generation means include a division section for dividing at least one group among each of the groups after being grouped at every arbitrary number of the spreading codes to increase a number of the groups, and a spreading code replacement section for changing combinations of the spreading codes included in each of the groups after being grouped or being divided, and said group selection means include a subtraction processing section for calculating a next maximum correlation value being a correlation value largest next to the maximum correlation value and calculating a difference between the next maximum correlation value and the maximum correlation value, a division instruction section for instructing the division section to perform the division when the difference is smaller than an arbitrary threshold value, and a replacement instruction section for instructing the spreading code replacement section to perform the replacement when a difference between the next maximum correlation value and the maximum correlation value is smaller than an arbitrary threshold value.

5. A communication terminal equipped with a radio receiver, said radio receiver comprising:

addition spreading code generation means for dividing an input spreading code group into at least two groups and adding spreading codes included in each group to each other at every chip to generate new spreading codes;

group selection means for calculating correlation values between each of the spreading codes generated by said addition spreading code generation means and a received signal and selecting a group having a maximum correlation value among the calculated correlation values, and control means for judging whether a number of spreading codes included in the group selected by said group selection means is one or not, and inputting all of the spreading codes included in the selected group into said addition spreading code generation means when the number of the spreading codes is two or more, and further setting the spreading codes included in the selected group to be used at despreading processing to the received signal when the number of the spreading code is one.

6. A method for identifying a spreading code, said method comprising:

an addition spreading code generation step for dividing a spreading code group into at least two groups and adding spreading codes included in each group to each other at every chip to generate new spreading codes;

a group selection step for calculating correlation values between each of the spreading codes generated by said addition spreading code generation means and a received signal and selecting a group having a maximum correlation value among the calculated correlation values, and a control step for judging whether a number of spreading codes included in the group selected at said group selection step is one or not, and returning all of the spreading codes included in the selected group into said addition spreading code generation step when the number of the spreading codes is two or more, and further setting the spreading codes included in the selected group to be used at despreading processing to the received signal when the number of the spreading code is one.

7. The method for identifying a spreading code according to claim 6, wherein in said group selection step, a next maximum correlation value being a correlation value largest next to the maximum correlation value is calculated, and a difference between the next maximum correlation value and the maximum correlation value is calculated, and further said addition spreading code generation step is controlled so that at least one group of each of the groups after being grouped is divided at every arbitrary number of the spreading codes to increase a number of the groups when the difference is smaller than an arbitrary threshold value.

8. The method for identifying a spreading code according to claim 6, wherein in said group selection step, said addition spreading code generation step is controlled so that combinations of the spreading codes included in each of the groups after being grouped are changed when the difference between the next maximum correlation value and the maximum correlation value is smaller than an arbitrary threshold value.

9. The method for identifying a spreading code according to claim 6, wherein in said group selection step, a next maximum correlation value being a correlation value largest next to the maximum correlation value is calculated, and a difference between the next maximum correlation value and the maximum correlation value is calculated, and increase of a number of the groups by dividing at least one group of each of the groups after being grouped at every arbitrary number of the spreading codes is instructed when the difference is smaller than an arbitrary threshold value, and/or change of combinations of the spreading codes included in each of the groups after being grouped or after being divided is instructed when the difference between the next maximum correlation value and the maximum correlation value is smaller than the arbitrary threshold value.

* * * * *